United States Patent Office 3,262,939
Patented July 26, 1966

3,262,939
PROCESS FOR PREPARING THIAZOLE-
4-ALDEHYDES
Arnold Kaufman, Scotch Plains, and George T. Wildman,
Elizabeth, N.J., assignors to Merck & Co., Inc., Rahway, N.J., a corporation of New Jersey
No Drawing. Continuation of application Ser. No.
128,698, Aug. 2, 1961. This application June 4,
1965, Ser. No. 461,500
4 Claims. (Cl. 260—302)

This application is a continuation of copending application Serial No. 128,698, filed August 2, 1961, and now abandoned.

This invention relates to the preparation of organic compounds useful as intermediates in the synthesis of anthelmintic compounds. More particularly it relates to a method for oxidizing lower alkyl substituted 5-membered heterocyclic compounds to obtain an aldehydo substituted derivative thereof. Specifically, the present invention relates to the vapor phase, catalytic oxidation of a lower alkyl substituent of thiazoles, isothiazoles, and thiadiazoles to the aldehydo radical.

It has recently been discovered that certain 2-substituted benzimidazoles have anthelmintic properties. Particularly significant in this regard are the benzimidazoles substituted in the 2-position with a 5-membered heterocyclic ring containing nitrogen and sulfur. Considerable difficulty, however, has been encountered in synthesizing these benzimidazoles because of the unreactive nature of certain substituents of the starting materials. For example, in synthesizing the 2- substituted benzimidazoles referred to, it is generally found convenient to react o-phenylenediamine or o-nitroaniline with a substituted 5-membered heterocyclic compound containing nitrogen and sulfur in the ring. The resulting anilide is then converted to the desired benzimidazole. It is required, of course, that the substituent on the heterocyclic compound be of an active type such as a carboxy or aldehydo group, in order to participate in the reaction. However, the most readily accessible substituted heterocyclic compounds generally contain lower alkyl groups as substituents, and these groups require a number of alterations in order to render them chemically active for use in synthesizing the 2- substituted benzimidazoles.

One method of converting the lower alkyl group to an active substituent has been to subject the lower alkyl substituted heterocyclic to a series of liquid phase reactions. A method of this type may be used in effecting the conversion of the lower alkyl group to a carboxy derivative, for example, but is generally undesirable because of the many reactions required to achieve the result. Heretofore, it has not been possible to oxidize the lower alkyl substituent directly to an active substituent such as the aldehydo or carboxy group. Hence, it would be very desirable to provide a direct, economical process for preparing the aldehydo substituted heterocyclic compound. It is one object of this invention to provide such a process. It is another object of this invention to provide a process for preparing intermediates useful in the synthesis of benzimidazole derivatives. It is another object of the present invention to provide a one-stage process for oxidizing a lower alkyl group to the aldehydo group when the lower alkyl group is a substituent of a thiazole, isothiazole, or thiadiazole compound. These and other objects will become more apparent when consideration is given to the following detailed disclosure.

According to the method of the present invention, a lower alkyl substituted 5-membered heterocyclic compound containing nitrogen and sulfur is oxidized in the vapor phase in the presence of a large excess of oxygen by passing a mixture thereof over a heated catalyst. Illustrative of the compounds which may be treated in accordance with the present invention are lower alkyl substituted thiazoles, isothiazoles, and thiadiazoles. The lower alkyl group present on the heterocyclic compounds may be at any free carbon atom. Compounds which particularly resist normal oxidation reactions and are therefore particularly amenable to the process of the present invention are 2-lower alkyl thiazole, 4-lower alkyl thiazole, 4-lower alkyl-(1,2,3-thiadiazole), 3-lower alkyl-(1,2,5-thiadiazole), 3-lower alkyl isothiazole, and 5-lower lakyl isothiazole.

In practicing the method of the present invention there is first formed a vapor mixture of the lower alkyl heterocyclic compound with oxygen. Conventional means of forming the mixture, as for example, in a carburetor flask, may be employed. This mixture is allowed to pass through suitable catalytic reactor equipment of the kind well known in the art, therein to come in contact with a heated catalyst more fully described hereinafter. An exothermic reaction takes place resulting in the oxidation of the lower alkyl substituent directly to the aldehydo group. The resulting aldehyde may then be separated from the unreacted components of the gaseous stream by techniques well known in the art. The unreacted components are than available for recycling through the heated catalyst bed as many times as desired. Any recycling should, of course, be carried out according to general principles of engineering practice whereby the accumulation of reaction by-products is limited, and the concentration of components in the entering gas stream is maintained at a level not detrimental to a good yield.

The catalysts employed in the oxidation of the lower alkyl substituent of the heterocyclic compound to the aldehydo group, according to the method of the present invention, are exemplified by vanadium pentoxide, molybdenum oxide, and tin vanadate. They may be used alone or supported on well known carrier vehicles. In this regard, silica, corundum, and alundum have been used successfully, although any other suitable vehicle may be employed. The particular catalysts used may be obtained commercially or may be prepared according to techniques well known in the catalyst art.

The surface area of the catalyst is not critical and is limited only by that which is commercially available or which may be obtained from a laboratory preparation. It is preferred however to use catalysts which have a surface area in the range of about 0.25–25 meters$^2$/gm.

In the method of the present invention, the catalyst is typically maintained at elevated temperatures. The particular temperatures employed will vary according to the volatility of the lower alkyl substituted heterocyclic compound being used. In general, temperatures in the range of 200° C. to 500° C. are suitable, with particular success being obtained when the catalyst is maintained at a temperature in the range of 250° C. to 400° C. The pressure at which the reaction takes place is not critical, atmospheric or pressures slightly above atmospheric being suitable.

The subsequent yields of the oxidation process of the present invention are advantageously affected when a large excess of oxygen is present. The oxygen may be supplied from any convenient source, such as air, for example. It is preferred, however, to use synthetic mixtures of oxygen and nitrogen, such as oxygen-enriched air, so as to provide the large excess of oxygen required, while at the same time avoiding the use of an unduly large volume of gas. The presence of nitrogen in the mixture is desirable because of its ability to moderate the exothermic reaction. It will be understood, however, that any other inert gas may be used for this purpose. Inert gases such as argon and helium are illustrative of those which may be employed. Since the inert gas serves to modify the exothermic nature of the reaction of the present invention, it should be present in an amount consistent with good safety practices. Hence, the absolute amount of inert gas used is not critical and may be varied according to individual requirements. Furthermore, it will be understood that the method of the present invention may be carried out without any inert gas at all provided good safety principles are adhered to. When air is used as the source of oxygen, it has been found that the corresponding amount of nitrogen fed therewith is adequate to control the reaction at a safe level.

With regard to the amount of oxygen used in the vapor mixture, a range of from 10 to 60 moles of oxygen per mole of lower alkyl heterocyclic compound is suitable. Good results are obtained, however, when about 20–50 moles of oxygen per mole of heterocyclic compound is used. It will be understood, however, that departure from the ranges herein presented may be employed. The extent to which such departure is made will be dependent upon the economic considerations involved in using a higher excess of oxygen than is indicated as opposed to the detrimental effect on yield resulting from too low an oxygen content.

The yield of the desired aldehydo substituted heterocyclic compound is, of course, dependent upon the length of time that the vapor phase mixture contacts the heated catalyst. The contact time is generally measured from the reaction conditions employed in the oxidation process and is conveniently expressed as the reciprocal of the space velocity. By space velocity is meant the volume of vapor mixture passing over the catalyst per unit time divided by the apparent volume of the catalyst. In general, the process of the present invention yields optimum results when a relatively long contact time is selected. Excessively long contact times should be avoided, however, to minimize the amount of decomposition which the product is liable to undergo under the reaction conditions employed. Therefore, although contact times between 0.5 and 60 seconds may be employed, it is preferred to select a value in the range of about 2–30 seconds.

After the lower alkyl substituted heterocyclic compounds have been treated in the manner described, the oxidized product, i.e. the aldehydo substituted heterocyclic compound, is removed from the exit gas stream by condensation. A water condenser, Dry Ice trap, or other conventional means may be employed for this purpose. It may then be purified by distillation for example, or by other techniques known in the art. The unreacted lower alkyl heterocyclic compound, and unreacted components are then available for recycling through the catalyst bed.

There has thus been described a method for converting the unreactive lower alkyl substituent of a heterocyclic compound containing nitrogen and sulfur atoms to the reactive aldehyde group. The aldehydes may then be reacted to obtain 2- substituted benzimidazoles as illustrated in Example 6 hereinbelow.

The following examples are given for purposes of illustration only and are not to be considered as limiting the scope of the invention.

EXAMPLE 1

*Thiazole-4-aldehyde*

A vapor mixture feed of 4-methylthiazole, oxygen, and nitrogen is made to contact a catalyst containing vanadium pentoxide supported on corundum at a temperature of about 345° C. and a space velocity of about 6.85 min.$^{-1}$ (equivalent to 8.8 sec., contact time). The composition of the vapor mixture feed is as follows:

|                   | Flow Rate Basis (STP) | Molar Ratio |
|---|---|---|
| 4-methylthiazole  | 5.84 cc. per min      | 53.9 moles per mole 4-methylthiazole. |
| Oxygen            | 314 cc. per min       |             |
| Nitrogen          | 154 cc. per min       |             |

The effluent from the reactor is allowed to pass first through a water condenser having 25° C. cooling water circulating therethrough wherein most of the oxidized product, thiazole-4-aldehyde, and unreacted 4-methylthiazole are condensed. The reaction gases are next passed through a liquid nitrogen trap wherein the remainder of the condensables are obtained.

The catalyst used in this example weighs 88.9 grams, has an apparent volume of 69.3 cc. and is composed essentially of vanadium pentoxide supported on corundum. The vanadium pentoxide constitutes about 9.5% of the bulk weight of the catalyst.

EXAMPLE 2

*Thiazole-4-aldehyde*

The procedure of Example 1 is followed using the catalyst described therein, and a vapor feed mixture of the following composition:

|                   | Flow Rate Basis (STP) | Molar Ratio |
|---|---|---|
| 4-methylthiazole  | 7.96 cc. per min      | 19.4 moles per mole 4-methylthiazole. |
| Oxygen            | 154 cc. per min       |             |
| Nitrogen          | 154 cc. per min       |             |

This corresponds to a space velocity of 4.58 min.$^{-1}$ or a contact time of 13.1 seconds. The reaction temperature is approximately 300° C. The resulting thiazole-4-aldehyde is recovered by condensation as in Example 1.

EXAMPLE 3

*Thiazole-2-aldehyde*

The procedure of Example 1 is followed except that a tin vanadate catalyst is used, and the vapor feed mixture has the following composition:

|                   | Flow Rate Basis (STP) | Molar Ratio |
|---|---|---|
| 2-methylthiazole  | 15.9 cc. per min      | 10.2 moles per mole 2-methylthiazole. |
| Oxygen            | 162 cc. per min       |             |
| Nitrogen          | 87 cc. per min        |             |

The reaction temperature is 265° C. The catalyst used is unsupported and has an apparent volume of 69.3 cc. The space velocity is calculated to be 3.83 min.$^{-1}$ corresponding to a contact time of 15.6 seconds. The resulting thiazole-2-aldehyde is recovered from the reaction gases as in Example 1.

EXAMPLE 4

*Isothiazole-4-aldehyde*

The procedure followed is that of Example 1 except that a molybdenum oxide catalyst supported on alundum is used, and the vapor feed mixture has the following composition:

|                    | Flow Rate Basis (STP) | Molar Ratio |
|---|---|---|
| 4-propylisothiazole | 14.1 cc. per min     | 22.2 moles per mole 4-propylisothiazole. |
| Oxygen             | 314 cc. per min       |             |
| Nitrogen           | 154 cc. per min       |             |

The reaction temperature is approximately 392° C. The catalyst used has an apparent volume of about 34.6 cc. and contains about 11.6% molybdenum oxide with the remainder being essentially the alundum support material. The space velocity is 14.0 min.$^{-1}$ corresponding to a contact time of 4.3 seconds. The resulting isothiazole-4-aldehyde is recovered from the reaction gases as in Example 1.

When the above procedure is repeated using 2-propylisothiazole or 5-propylisothiazole as the starting material, the corresponding 2-aldehydo and 5-aldehydo substituted isothiazoles are obtained.

EXAMPLE 5

*1,2,3-thiadiazole-5-aldehyde*

The procedure followed is that of Example 1 using the catalyst described therein, and a vapor feed mixture of the following composition:

|  | Flow Rate Basis (STP) | Molar Ratio |
|---|---|---|
| 5-propyl-1,2,3-thiadiazole. | 4.5 cc. per min | 15.8 moles per mole 5-propyl-1,2,3-thiadiazole. |
| Oxygen | 71 cc. per min | |
| Nitrogen | 112 cc. per min | |

The reaction temperature is approximately 400° C. The space velocity is 2.7 min.$^{-1}$ corresponding to a contact time of 22.3 seconds. The resulting 1,2,3-thiadiazole-5-aldehyde is recovered from the reaction gases as in Example 1.

In a manner similar to that described in this example, the starting materials are varied to include 4-propyl-1,2,3-thiadiazole, 3-propyl-1,2,5-thiadiazole, 4-propyl-1,2,5-thiadiazole, 2-propyl-1,3,4-thiadiazole, or 5-propyl-1,3,4-thiadiazole to obtain the corresponding aldehydo substituted thiadiazoles.

EXAMPLE 6

*Preparation of 2-(4'-thiazolyl)benzimidazole*

This example is illustrative of a procedure which may be followed in converting the aldehydo-substituted heterocyclic compounds to the corresponding 2-substituted benzimidazoles.

22.6 gm. of thiazole-4-aldehyde in 25 ml. of methanol is added to a suspension of 22 gm. of o-phenylenediamine in 75 ml. of nitrobenzene. The resulting mixture is stirred at room temperature for a few minutes and then heated slowly to 210° C. for one minute. During the heating period, the methanol is removed by distillation. The reaction mixture is then cooled with stirring to about 10° C. whereupon the 2-(4'-thiazolyl)benzimidazole crystallizes. It is filtered off and washed with ether. Any nitrobenzene remaining with the product is removed by recrystallization of the benzimidazole from alcohol.

It will be evident to those skilled in the art that various modifications and changes in the process of the present invention may be made without departing from the scope thereof. All such changes and modifications are intended to be encompassed within the appended claims.

What is claimed is:

1. The method for producing thiazole-4-aldehyde which comprises forming a vapor mixture of a 4-lower alkyl thiazole with oxygen and contacting said mixture with a catalyst heated to a temperature of between 200° C. and 500° C., said catalyst containing a material selected from the group consisting of vanadium oxide, molybdenum oxide, and tin vanadate.

2. The method for producing thiazole-4-aldehyde which comprises forming a vapor mixture of a 4-lower alkyl thiazole with oxygen in the molar ratio of from 10–60 moles of oxygen per mole of 4-lower alkyl thiazole, and contacting said mixture with a catalyst containing a material selected from the group consisting of vanadium oxide, molybdenum oxide, and tin vanadate, at a temperature of between 250° C. and 500° C. and wherein the lower alkyl substituent of said 4-lower alkyl thiazole contains from 1–3 carbon atoms.

3. The method according to claim 2 wherein the 4-lower alkyl thiazole is 4-methylthiazole.

4. The method according to claim 3 wherein the catalyst contains vanadium pentoxide.

No references cited.

HENRY R. JILES, *Acting Primary Examiner.*

ALTON D. ROLLINS, *Assistant Examiner.*